US012694356B2

(12) United States Patent
Mortimer et al.

(10) Patent No.: US 12,694,356 B2
(45) Date of Patent: Jul. 28, 2026

(54) CUSTOMER SERVICE STAFFING PLAN GENERATION BASED ON FORECASTED DEMAND AND SERVICE GOALS

(71) Applicant: Verint Americas Inc., Alpharetta, GA (US)

(72) Inventors: Nicholas Mortimer, Sheffield (GB); Scott Lindsay, Gregory, MI (US); Jonathan Silverman, Palo Alto, CA (US)

(73) Assignee: Verint Americas Inc., Alpharetta, GA (US)

( * ) Notice: Subject to any disclaimer, the term of this patent is extended or adjusted under 35 U.S.C. 154(b) by 146 days.

(21) Appl. No.: 18/095,244

(22) Filed: Jan. 10, 2023

(65) Prior Publication Data

US 2024/0232778 A1     Jul. 11, 2024

(51) Int. Cl.
   *G06Q 10/0639*     (2023.01)
   *G06Q 10/0637*     (2023.01)
(52) U.S. Cl.
   CPC . *G06Q 10/06393* (2013.01); *G06Q 10/06375* (2013.01)
(58) Field of Classification Search
   CPC .. G06Q 10/06315; G06Q 10/06; G06Q 10/04; G06Q 10/06311; G06Q 10/0631; G06Q 10/0637; G06Q 10/063118; G06Q 10/06313; G06Q 10/105
   See application file for complete search history.

(56) References Cited

U.S. PATENT DOCUMENTS 6,952,732 B2 * 10/2005 Nourbakhsh ....... H04M 3/5233
                                                    709/225
6,970,829 B1 * 11/2005 Leamon ......... G06Q 10/063116
                                                    705/7.14
7,085,728 B2 * 8/2006 Sarlay ................ G06Q 30/0202
                                                    705/7.22

(Continued)

OTHER PUBLICATIONS

Call Center Metrics: Best Practices in Performance Measurement and Management to Maximize Quitline Efficiency and Quality NAQC, 2010 (Year: 2010).*

(Continued)

*Primary Examiner* — Scott L Jarrett
(74) *Attorney, Agent, or Firm* — Dinsmore & Shohl LLP

(57)                ABSTRACT

A method for providing benchmark-plans to a customer based on benchmark information, comprising receiving a customer-defined service goal and a demand forecast for the customer; generating, with a planner, a plan for achieving the customer-defined service goal based on the demand forecast; determining a benchmark category from a plurality of benchmark categories that the customer belongs to based on at least an industry of the customer, wherein the benchmark category defines a plurality of other customer-defined service goals for other customers participating in at least the industry as the customer; determining benchmark service goals based on the determined benchmark category; executing the planner for each of the benchmark service goals thereby generating benchmark-plans for the demand forecast for the customer; and outputting, to the customer, the plan and the benchmark-plans, wherein the benchmark-plans are different from the plan.

20 Claims, 5 Drawing Sheets

(56) References Cited

U.S. PATENT DOCUMENTS

| | | | | |
|---|---|---|---|---|
| 7,702,411 | B2 * | 4/2010 | Bagchi | G06Q 10/06312 |
| | | | | 700/99 |
| 8,214,441 | B2 * | 7/2012 | Bangalore | G06Q 10/06311 |
| | | | | 705/14.1 |
| 8,364,519 | B1 * | 1/2013 | Basu | G06Q 10/06393 |
| | | | | 705/7.38 |
| 8,660,870 | B2 * | 2/2014 | Giancola | G06Q 30/02 |
| | | | | 705/7.11 |
| 8,687,795 | B2 * | 4/2014 | Kosiba | G06Q 10/10 |
| | | | | 379/265.06 |
| 9,020,142 | B2 * | 4/2015 | Kosiba | G06Q 10/06311 |
| | | | | 379/265.06 |
| 10,140,164 | B2 * | 11/2018 | Mehta | G06F 16/24578 |
| 11,076,047 | B1 * | 7/2021 | Clodore | G06Q 30/01 |
| 11,272,061 | B2 * | 3/2022 | Frangos | H04M 3/5175 |
| 11,368,588 | B1 * | 6/2022 | Johnston | G06N 20/00 |
| 11,522,999 | B2 * | 12/2022 | Frangos | H04M 3/5175 |
| 11,632,468 | B2 * | 4/2023 | Frangos | G06Q 10/063114 |
| | | | | 379/265.03 |
| 11,734,624 | B2 * | 8/2023 | D'Attilio | H04M 3/5175 |
| | | | | 705/7.16 |
| 12,079,821 | B2 * | 9/2024 | Ellison | G06N 20/00 |
| 2002/0184069 | A1 * | 12/2002 | Kosiba | G06Q 10/06315 |
| | | | | 705/7.38 |
| 2003/0009520 | A1 * | 1/2003 | Nourbakhsh | H04M 3/5233 |
| | | | | 709/204 |
| 2005/0065837 | A1 * | 3/2005 | Kosiba | G06Q 10/06375 |
| | | | | 705/7.31 |
| 2007/0156718 | A1 * | 7/2007 | Hossfeld | G06Q 90/00 |
| 2010/0274632 | A1 * | 10/2010 | Pullin | G06Q 30/0282 |
| | | | | 705/347 |
| 2014/0280014 | A1 * | 9/2014 | Komissarchik | G06Q 10/06 |
| | | | | 707/710 |
| 2016/0088153 | A1 * | 3/2016 | Wicaksono | H04M 3/523 |
| | | | | 379/265.06 |
| 2016/0171422 | A1 * | 6/2016 | Wicaksono | G06Q 10/063118 |
| | | | | 705/7.17 |
| 2016/0173692 | A1 * | 6/2016 | Wicaksono | G06Q 10/067 |
| | | | | 379/265.03 |
| 2017/0243150 | A1 * | 8/2017 | Dave | G06Q 30/0254 |
| 2017/0270099 | A1 * | 9/2017 | Gorny | G06F 17/18 |
| 2018/0024868 | A1 * | 1/2018 | Mehta | G06F 16/24569 |
| | | | | 718/104 |
| 2019/0138997 | A1 * | 5/2019 | Haas | G06Q 10/105 |
| 2020/0082319 | A1 * | 3/2020 | Gouw | G06Q 10/06315 |
| 2021/0056481 | A1 * | 2/2021 | Wicaksono | G06Q 10/067 |
| 2021/0224706 | A1 * | 7/2021 | Wicaksono | G06Q 10/0639 |
| 2022/0027837 | A1 * | 1/2022 | D'Attilio | H04M 3/5175 |
| 2022/0030111 | A1 * | 1/2022 | Frangos | H04M 3/5191 |
| 2022/0174156 | A1 * | 6/2022 | Frangos | H04M 3/5191 |
| 2022/0383225 | A1 * | 12/2022 | Berkowitz | G06Q 30/0201 |
| 2023/0058543 | A1 * | 2/2023 | Graf | G06Q 30/0203 |
| 2023/0078914 | A1 * | 3/2023 | Frangos | H04M 3/5175 |
| | | | | 379/265.03 |
| 2024/0220883 | A1 * | 7/2024 | Maciej | G06Q 10/06315 |

OTHER PUBLICATIONS

The Utilmate Guide to the Call Center Metrics that Matter Most Evolve IP, Jun. 2019 (Year: 2019).*

Filva, Silipa, A step-by-step guide to contact center benchmarking Talkdesk, Jun. 29, 2021 (Year: 2021).*

Cleveland, Brad, Contact Center Management on Fast Forward: Succeeding in the New Era of Customer Experience, Fourth Edition, Chapters 6, 7, 10; Aug. 2019 (Year: 2019).*

Anton, Jon et al., Call Center Benchmarking: How Good is Good Purdue University Press Books, Jun. 1, 2000 (Year: 2000).*

Kim et al., A Discrete Event Simulation Study for Incoming Call Centers of a Telecommunication Service Company. Artificial Intelligence and Simulation. AIS 2004. Lecture Notes in Computer Science(), vol. 3397. (Year: 2004).*

Alsamadi, Samer et al., Call center agent scheduling evaluation using discrete event simulation: a decision support tool WSC 2022—Winter Simulation Conference, Dec. 2022 (Year: 2022).*

Mathew, Benny et al., A Tutorial on Modeling Call Centres Using Discrete Event Simulation Proceedings 27th European Conference on Modelling and Simulation, 2013 (Year: 2013).*

Discrete-event simulation—definition Wikipedia.org, Retrieved Jan. 3, 2025 (Year: 2025).*

* cited by examiner

300

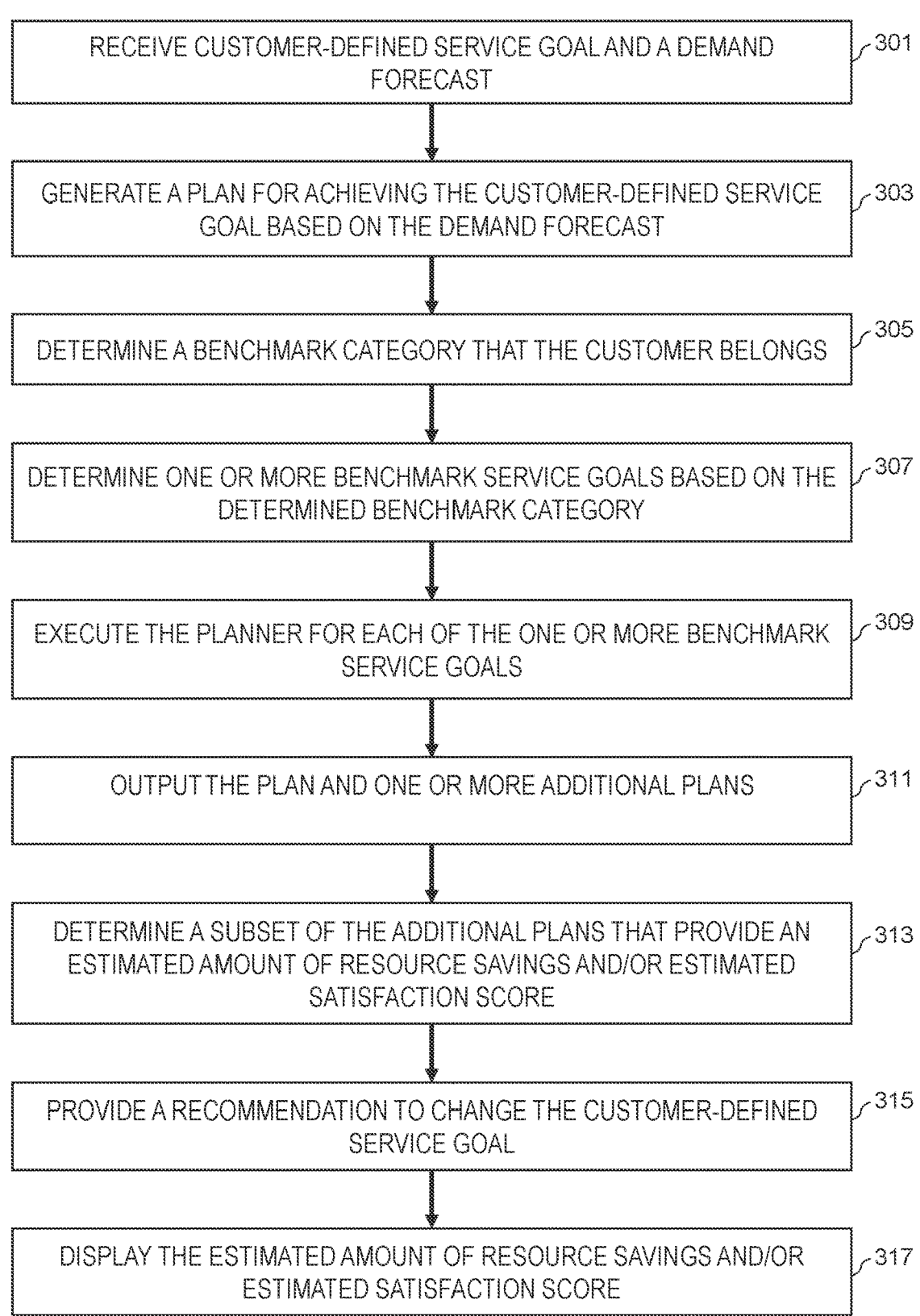

RECEIVE CUSTOMER-DEFINED SERVICE GOAL AND A DEMAND FORECAST ⟋301

GENERATE A PLAN FOR ACHIEVING THE CUSTOMER-DEFINED SERVICE GOAL BASED ON THE DEMAND FORECAST ⟋303

DETERMINE A BENCHMARK CATEGORY THAT THE CUSTOMER BELONGS ⟋305

DETERMINE ONE OR MORE BENCHMARK SERVICE GOALS BASED ON THE DETERMINED BENCHMARK CATEGORY ⟋307

EXECUTE THE PLANNER FOR EACH OF THE ONE OR MORE BENCHMARK SERVICE GOALS ⟋309

OUTPUT THE PLAN AND ONE OR MORE ADDITIONAL PLANS ⟋311

DETERMINE A SUBSET OF THE ADDITIONAL PLANS THAT PROVIDE AN ESTIMATED AMOUNT OF RESOURCE SAVINGS AND/OR ESTIMATED SATISFACTION SCORE ⟋313

PROVIDE A RECOMMENDATION TO CHANGE THE CUSTOMER-DEFINED SERVICE GOAL ⟋315

DISPLAY THE ESTIMATED AMOUNT OF RESOURCE SAVINGS AND/OR ESTIMATED SATISFACTION SCORE ⟋317

RECEIVE INTERACTION DATA OF A PLURALITY OF CUSTOMERS — 401

ANONYMIZE THE MINED INTERACTION DATA — 403

CATEGORIZE THE ANONYMIZED MINED INTERACTION DATA — 405

PUBLISH BENCHMARKS FOR DEFINED METRICS ON A PREDETERMINED FREQUENCY — 407

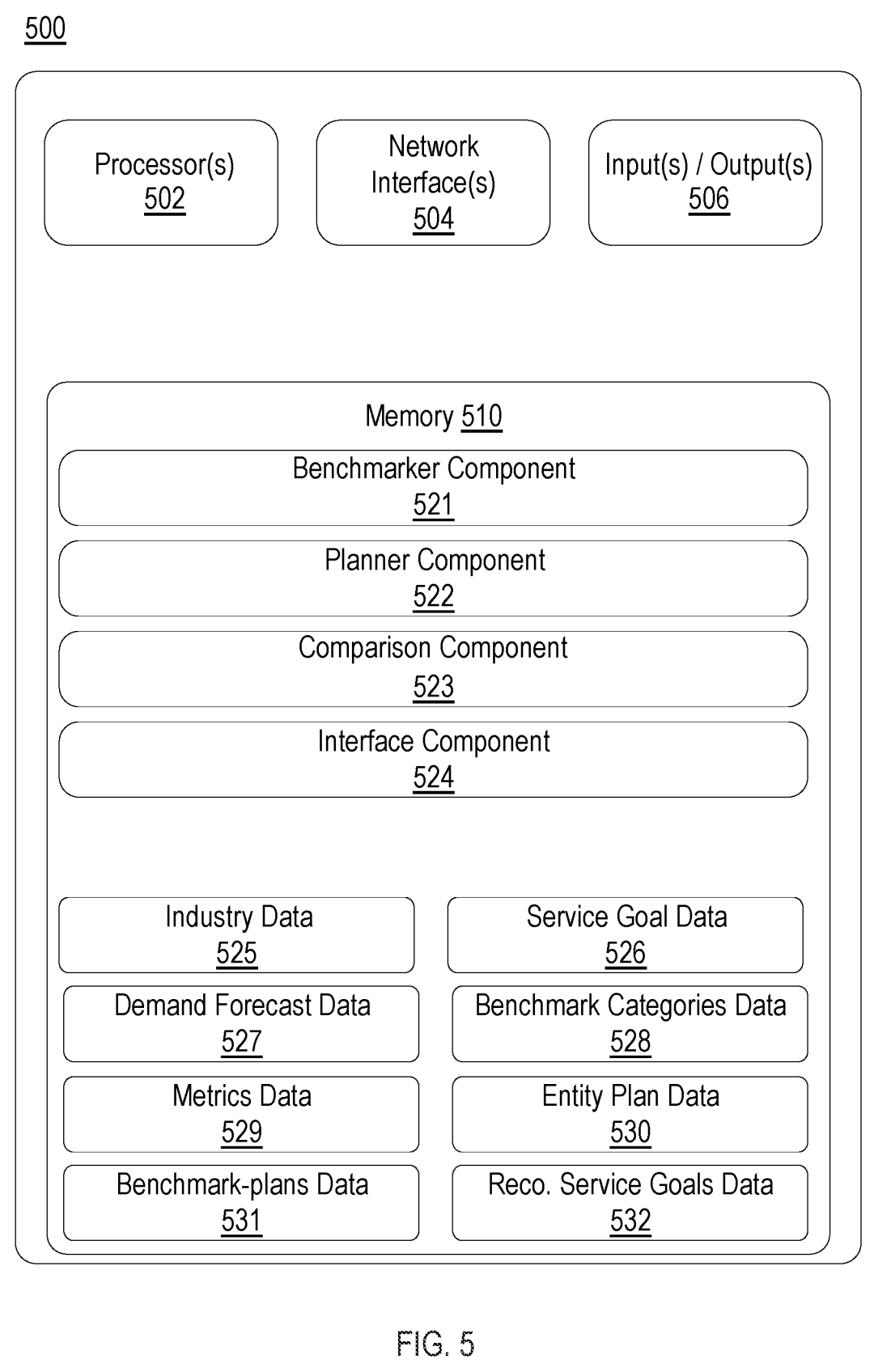

500

Processor(s)
502

Network Interface(s)
504

Input(s) / Output(s)
506

Memory 510

Benchmarker Component
521

Planner Component
522

Comparison Component
523

Interface Component
524

Industry Data
525

Service Goal Data
526

Demand Forecast Data
527

Benchmark Categories Data
528

Metrics Data
529

Entity Plan Data
530

Benchmark-plans Data
531

Reco. Service Goals Data
532

FIG. 5

CUSTOMER SERVICE STAFFING PLAN GENERATION BASED ON FORECASTED DEMAND AND SERVICE GOALS

TECHNICAL FIELD

The present disclosure relates to systems and methods for providing resource forecasting and scheduling, and more specifically to developing resource plans for a customer based on, for example, a service goal, a forecasted demand, and an anonymized benchmark associated with a customer's industry.

BACKGROUND

Workforce engagement and workforce management solutions have proven to elevate organizational productivity. For example, workforce engagement and workforce management solutions have led to reduction in customer engagement operating costs, improved efficiency with respect to the handling of specific tasks, and reduced employee turnover rates. Artificial intelligence models, data analytics, and cloud computing environments have been developed to handle the complex nature of workforce engagement and workforce management tasks and the data-driven forecasting and scheduling processes that provide solutions to meet service metrics desired by an organization. However, current solutions are limited to the context of an individual customer's organization, for example, based on the customer's own historical operating, service, and satisfaction metrics, which limits the evaluation context to meet service goals and manage resources.

Accordingly, a need exists for improved systems and methods for providing intelligent forecasting with benchmarks.

SUMMARY

In a first embodiment, a method for providing one or more benchmark-plans to a customer based on benchmark information includes receiving a customer-defined service goal and a demand forecast for the customer; generating, with a planner, a plan for achieving the customer-defined service goal based on the demand forecast; determining a benchmark category from a plurality of benchmark categories that the customer belongs to based on at least an industry of the customer, where the benchmark category defines a plurality of other customer-defined service goals for other customers participating in at least the industry as the customer; determining one or more benchmark service goals based on the determined benchmark category; executing the planner for each of the one or more benchmark service goals thereby generating one or more benchmark-plans for the demand forecast for the customer; and outputting, to the customer, the plan and the one or more benchmark-plans, where the one or more benchmark-plans are different from the plan.

In another embodiment, a computer-implemented system for providing one or more benchmark-plans to a customer based on benchmark information includes: a processor and a non-transitory computer-readable medium storing computer readable instructions that, when executed by the processor, cause the system to: receive a customer-defined service goal and a demand forecast for the customer; generate, with a planner, a plan for achieving the customer-defined service goal based on the demand forecast; determine a benchmark category from a plurality of benchmark categories that the customer belongs to based on at least an industry of the customer, where the benchmark category defines a plurality of other customer-defined service goals for other customers participating in at least the industry as the customer; determine one or more benchmark service goals based on the determined benchmark category; execute the planner for each of the one or more benchmark service goals thereby generating one or more benchmark-plans for the demand forecast for the customer; and output, to the customer, the plan and the one or more benchmark-plans, where the one or more benchmark-plans are different from the plan.

In another embodiment, a system for providing one or more benchmark-plans to a customer based on benchmark information includes a computing device communicatively coupled to one or more cloud based servers, the computing device configured to: receive, as an input from a user, a customer-defined service goal receive, from one of the one or more cloud based servers, a demand forecast for the customer; receive, from a planner deployed on one of the one or more cloud based servers, a plan for achieving the customer-defined service goal based on the demand forecast; determine a benchmark category from a plurality of benchmark categories that the customer belongs to based on at least an industry of the customer, where the benchmark category defines a plurality of other customer-defined service goals for other customers participating in at least the industry as the customer; determine one or more benchmark service goals based on the determined benchmark category; execute the planner for each of the one or more benchmark service goals thereby generating one or more benchmark-plans for the demand forecast for the customer; and output, to the customer, the plan and the one or more benchmark-plans, where the one or more benchmark-plans are different from the plan.

These and additional features provided by the embodiments described herein will be more fully understood in view of the following detailed description, in conjunction with the drawings.

DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3 depicts an illustrative flowchart for an example method for developing resource plans, according to one or more embodiments shown and described herein.

FIG. 5 schematically depicts an example computing network and computing device for implementing the intelligent forecaster with benchmarks, according to one or more embodiments shown and described herein.

DETAILED DESCRIPTION

Figure 1:
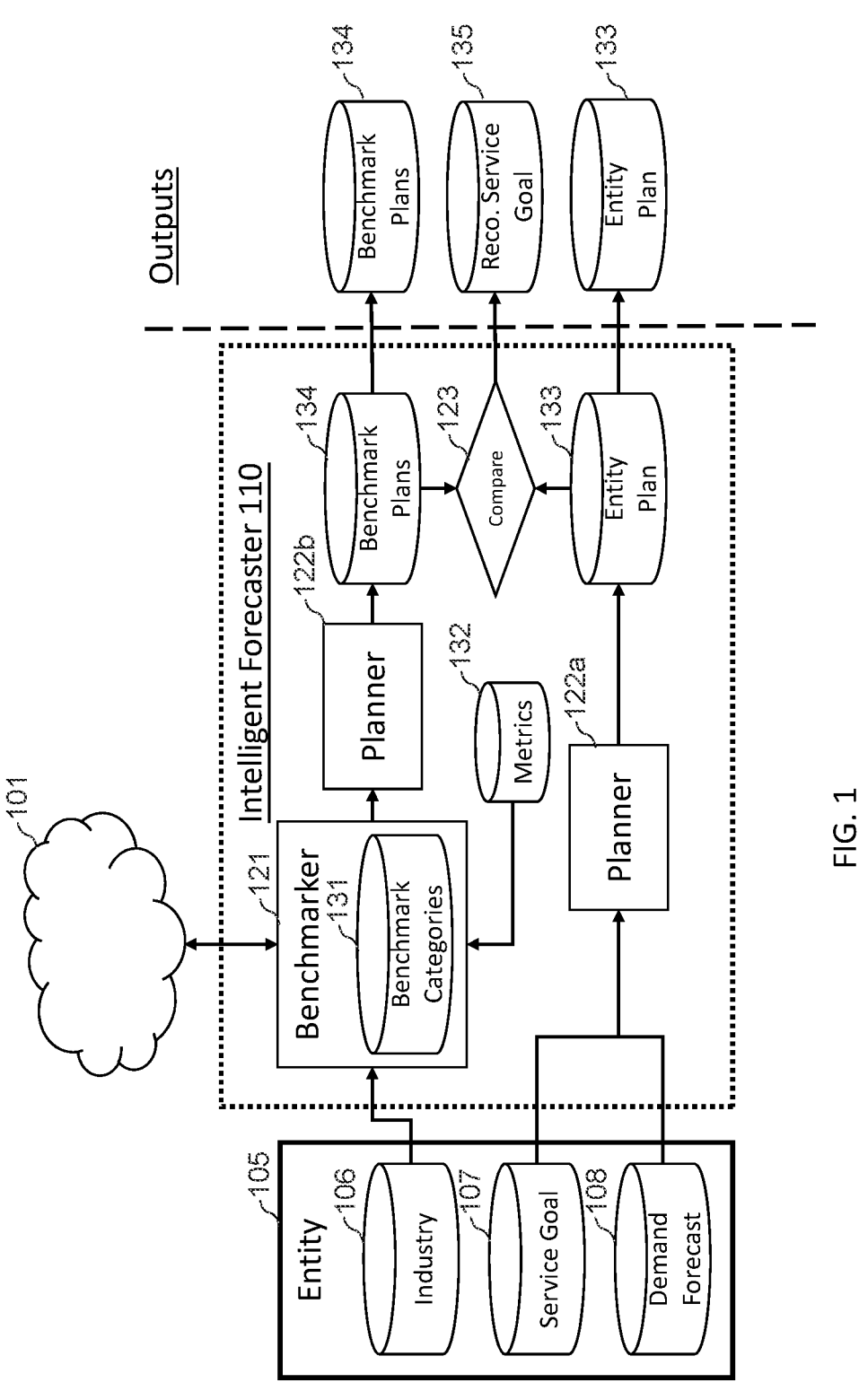
FIG. 1 schematically depicts an illustrative implementation diagram for the intelligent forecaster with benchmarks, according to one or more embodiments shown and described herein.

Embodiments of the present disclosure are directed to providing intelligent forecasting with benchmarks. In general, forecasts are based on analyses of data, determining trends from the data, and using the trends to make predictions. As such, limitations to making accurate and useful forecasts arise when data sources are limited. Additionally, inaccuracies further arise when dissimilar data is analyzed and used to make predictions. For example, when a customer's organization forecasts a plan, such as a hiring or staffing plan to support future operations, the forecasters are limited to the customer's own historical data.

Embodiments of the present disclosure improve forecasting processes by enabling the incorporation of de-identified and anonymized benchmark data. The benchmark data is collected from operations of other organizations that are similar to the customer's organization. Through the incorporation of benchmark data in the intelligent forecasting processes described herein, a plan and service goals that a customer's organization (e.g., an entity) is provided and/or uses to make changes to implemented plans leads to, for example, reductions in customer engagement operating costs, improvements in efficiency with respect to the handling of specific tasks, and even a further reduce employee turnover rates while remaining competitive among their peers.

The intelligent forecaster with benchmarks described herein utilizes unique processes to enable the collection of and reliance on other organization's performance data, interaction data, and the like, to generate more informed forecasts and recommendations that further improve plans and/or service goals.

For example, in one embodiment, the methods of intelligent forecasting with benchmarks described herein can be utilized to improve workforce management solutions. Workforce management can be summarized as the processes utilized for allocating resources (e.g., human resources, technical resources, equipment, etc.) to the appropriate task at the right time in response to demand (i.e., either a current demand or a forecasted demand) in order to meet objectives, such as, for example, service goals. Some examples of service goals include optimizing productivity, reducing risks, reducing employee turnover, improving or maintaining quality of service, creating a positive impact for an organization, and/or the like. Workforce management solutions are tools (e.g., a combination of device and software based tools) that enable an organization to handle the complex nature of workforce management tasks and the ever-growing desire to utilize data-driven forecasting and scheduling plans.

The methods of intelligent forecasting with benchmarks described herein may be deployed through a cloud-computing platform optionally having an open, multi-cloud architecture. An example of an existing workforce management solution is Verint's Da Vinci™ AI and Analytics platform. Further, embodiments described herein can be implemented with various different workforce management solutions to improve the solutions provided by each.

Note that various embodiments of the intelligent forecaster with benchmarks disclosed herein are generally described with respect to the operations and services provided by a contact center as one example use case. However, the methods of intelligent forecasting with benchmarks described herein can be utilized in a variety of other use cases, such as food industry staffing, utility industry resource allocations, and the like. Some other use cases include supporting back office operations such as claims processing administration, new account origination, existing client servicing, and the like.

In some embodiments, the methods of intelligent forecasting with benchmarks disclosed herein produce, as useful output, plans (e.g., an entity plan that is generated based on a customer-defined service goal based on the demand forecast and one or more benchmark-plans that is generated based on benchmark data), such as a staffing plan. In some cases, such plans are based on a customer-defined service goal and demand forecast along with benchmark information derived from other organizations' operations. Beneficially, such plans are further based on how the organization, anonymized within a benchmark group of other organizations, operates their organizations and their corresponding service levels. An output of the process includes providing to the customer a benchmark-plan. The benchmark-plan can be compared to the entity plan determined based on a customer-defined service goal and a demand forecast. As described in more detail herein, variations in the entity plan and the benchmark-plan enable a customer to execute what-if analyses to identify changes to the customer-defined service goal that lead to improved customer experiences or other goals, such as resources savings, cost savings associated with implementing the changes, and the like.

Embodiments of the intelligent forecaster with benchmarks improve upon conventional solutions for forecasting and scheduling by developing additional solutions based on relevant benchmarks derived from activities for other organizations, such as peer organizations. The improvements are made possible by implementing one or more application programming interfaces (API) configured to compile, anonymize, and analyze information from other organizations in, for example, the same industry operating across multi-cloud environments or other computing environments. In embodiments, the anonymized information includes service goals, service level metrics, customer satisfaction statistics, and/or other metrics, some of which are described with respect to various example embodiments herein. Service level metrics refer to quantifiable measures such as the time to respond to an email or the time to answer a call. Customer satisfaction statistics refer to ratings that customers provide in response to the interaction with a contact center representative, for example.

Thus, the systems and methods described herein allow organizations to simulate and adopt changes to service goals based on leveraging other organizations' performance. Additionally, the systems and methods enable the exploitation of large amounts of data (e.g., cloud-based data) to identify areas that would need special consideration and focus to change, and the potential impact on customer experience metrics.

Example Implementation of the Intelligent Forecaster

Turning to FIG. 1, an illustrative implementation diagram for the intelligent forecaster 110 with benchmarks is depicted. As described in more detail herein, the intelligent forecaster 110 with benchmarks is configured to generate an entity plan 133 for a customer's organization (e.g., also referred to herein as "entity") and one or more benchmark-plans 134 based on operational data of other organizations, for example, that are in the same industry as the customer's organization. The entity plan 133 provides a plan, such as a staffing plan, resource allocation plan, hiring plan, and the like, for predicted future operations of the customer's organization. The one or more benchmark-plans 134 provides service goals and plans that organizations, for example, in the sane industry as the customer's organization utilize. The one or more benchmark-plans 134 provide a relatable source that can be compared to the entity plan 133 so that recommendations for updates to the entity plan and/or service goals of the customer's organization can be made to the customer. The recommendations may change the service goals or a staffing plan, for example, to a measure that is competitive for the customer within the industry, but may also deliver a positive impact for the organization. Such impacts may include retention improvements, quality of service improvements, efficiency improvements, and/or the like.

More specifically, the intelligent forecaster 110 with benchmarks includes a benchmarker 121 and planner 122 (e.g., planners 122a and 122b). The intelligent forecaster 110 is communicatively coupled to a cloud-computing network 101. The cloud-computing network 101 includes a plurality of cloud infrastructures (e.g., devices, and services such as infrastructures as a service (IaaS), platform as a service (PaaS), and software as a service (SaaS)) and/or computing devices and servers interconnected with each other via a network.

In embodiments, the intelligent forecaster 110 is configured to receive information from an entity (e.g., a customer's organization). The information includes, for example, but is not limited to, an industry 106 of the customer's organization, a service goal 107, and a demand forecast 108.

The industry 106 refers to the activities in which an organization participates. For example, an entity 105 may be in contact call center industry where a workforce comprising humans and bots respond to communications from clients. This is merely an example industry. The breadth of the industry 106 defined for purposes of implementing the intelligent forecaster 110 may be tailored by a customer. For example, a customer may desire to more narrowly define the contact call center industry to contact call centers that field insurance related communications, reservation related communications, technical support communications, or the like. Moreover, the industry 106 may be more broadly defined to include more than just contact call centers. For example, the contact call center industry may be more broadly defined as a client services industry.

Service goals refer to measurable parameters defining a task objective. For example, for a contact center handling one or more different communication channels (e.g., including, but not limited to, phone calls, text messages, emails, video, radio, and social media), a service goal may be defined by the percentage of calls or emails answered within a predefined period of time. More particularly, for example, a call center service goal may be to answer 85% of all calls within 20 seconds. Typically, changes to the service goal (e.g., changing the service goal to answering 90% of all calls within 10 seconds) can affect consumer satisfaction scores. Additionally, for efficient operation and efficient utilization of resources (e.g., human, technical, and financial resources) understanding the current or future levels of demand is important. That is, changes in demand can result in the underutilization of resources, such as having too many staff members when demand drops, or the failure to meet a predetermined service goal, for example, because there is inadequate staff to meet an increase in demand. However, determining the optimal service goal and plan (e.g., resource allocation such as staffing and hiring plans) for achieving the service goal in view of a demand forecast 108 when based on only a customer's historical data leads to significant trial and error exercises and potentially costly rework of organizational operations in addition to the hiring and reallocation of human resources. The workforce management solution of the present disclosure provide improvements to the these challenges by consolidating, anonymizing, and analyzing operating and service metrics from other organizations into benchmarks so that they can be proposed and/or compared to a customer's service goal and process of developing a plan that delivers resource savings and increases or maintains satisfaction scores.

The demand forecast 108 data refers to demand trends, seasons, and the like. The demand forecast 108 may be determined by collecting and analyzing customer and competitor historical volumes in addition to predictive algorithms configured to generate a demand forecast. However, this is only one example, other methods for generating a demand forecast 108 may be used.

In embodiments, a planner 122a of the intelligent forecaster 110 ingests the service goal 107 and the demand forecast 108 for an entity and generates an entity plan 133. The planner 122a includes a set of instructions that when executed generate a plan for achieving a customer-defined service goal (or goals) based on a demand forecast. In embodiments, the planner 122 can be executed in response to a customer inquiry or automatically in response to execution or completion of another process, such as determining benchmark service goals with the benchmarker 121. For example, in the context of a contact center, the planner 122a includes a model of the queues and available profiles or types of agents for a contact center. In embodiments, customer defined service goals and demand forecasts by period are input for each queue to predict the expected workloads. The planner component uses advanced search and discrete event simulation algorithms to estimate and evaluate the impact of different possible staffing plans. The planner 122a may include an optimization component, which can tailor the estimation and evaluation process to arrive at an optimal result based on a customer's defined service goals.

Additionally, the intelligent forecaster 110 generates one or more benchmark-plans 134. The process for generating the one or more benchmark-plans 134 includes the benchmarker 121 and a planner 122b. Note that although FIG. 1 depicts two planners 122a and 122b, other embodiments may implement a single planner component that performs the operations of the two planners 122a and 122b depicted in this example.

In general, the benchmarker 121 is configured to communicatively interface with a plurality of cloud infrastructures (e.g., devices, and services such as infrastructures as a service (IaaS), platform as a service (PaaS), and software as a service (SaaS)) deployed for example on the cloud-computing network 101. The benchmarker 121 is configured to gather interaction and source data for each metric algorithm (e.g., the set of metrics 132) from a cloud infrastructure and connect to the cloud infrastructure in a manner that anonymizes and de-identifies companies so that the removal of all personal identifiable data is ensured. In some embodiments, the benchmarker 121 is also configured to verticalize the source data. As used herein, the term "verticalize" refers to the aggregation, refinement, and optionally presentation of benchmarks by a particular type of industry. For example, rather than just expressing benchmarks under a general industry category such as "contact centers", verticalization enables results to be presented in more specific industry types such as by "Financial Services Contact Center", "Telecoms Contact Center", or "Insurance Contact Center" for greater applicability to the customer's operating industry.

In some embodiments, the relatedness of a benchmark category to the customer's organization may be scored by comparing a number of parameters defining the entity 105 and the organizations of the benchmark category. For example, industry is one parameter. Other parameters may include size of the organization, location of the organization, and the like. The score may be returned to the customer with one or more benchmark-plans 134. Additionally, in some embodiments, a benchmark category will not be selected if predetermined criteria for anonymization are not met. For example, the predetermined criteria may state that there needs to be a minimum number of different organizations contributing data to the benchmark category so that anonymization can be assured. In other words, since operations of organizations contributing to the benchmarking dataset may be competitors of a customer's organization there is a need to assure that the benchmarking dataset will not directly disclose a competing organization's operations such as their service goals and satisfaction scores.

Once a plurality of benchmark categories 131 are defined, the benchmarker 121 identifies and selects at least one benchmark category that the entity 105 belongs to. For example, the selection of the at least one benchmark category may be based on comparing a parameter such as industry. The benchmark categories refer to a collection of de-identified, anonymized, and non-sensitive data that are categorized based on a set of parameters, such as industry and/or other groups. Some example industries include, contact center services, insurance, reservation services, concierge services, technical support services, and the like. The process of generating plurality of benchmark categories 131 can be carried out by a sub-component of the benchmarker 121 referred to as an ingestion API (I-API), which will be described in more detail herein with respect to FIG. 2.

The benchmarker 121 includes a set of instructions that when executed is configured to receive requests for category and/or metrics for one or more benchmark categories so that the system can determine a benchmark category from the plurality of benchmark categories that the customer's organization belongs to based on at least an industry of the customer's organization (e.g., the entity). Note that the industry metric is only one example of a metric, which may be considered to determine the benchmark category.

The metrics 132 is a list of task or organization focused operating and service metrics defining the data to be collected, if available, from the operational data of companies deploying their services within the cloud-computing network 101. The metrics 132 are capable of being tailored to a specific industry or task and may include new metrics over time.

After the benchmark category for an entity 105 is determined, one or more service goals for the organizations belonging to the determined benchmark category are received by the planner 122*b*. The planner 122*b*, which may be same or similar to the planner 122*a*, generates one or more benchmark-plans 134 for each of the benchmark service goals based on the data collected from organizations belonging to the benchmark category, which are different from the entity 105. The process of determining benchmark service goals and other benchmarks from anonymized data of the benchmark category corresponding to the customer's organization can be carried out by a sub-component of the benchmarker 121, such as by a reporting API (R-API) that is described in more detail with respect to FIG. 2.

In some embodiments, the entity plan 133 and the one or more benchmark-plans 134 are output to the customer. The output to the customer may be a GUI, structured document, or the like. The one or more benchmark-plans 134 output to the customer may also include analytical information such as satisfaction scores, percentage of the organizations that are utilizing particular service goals, and the like.

In some embodiments, the intelligent forecaster 110 may further perform one or more comparison operations 123 with the entity plan 133 and the one or more benchmark-plans 134. The one or more comparison operations 123 can identify potential changes to the entity's service goal 107 that delivery an improvement in satisfaction score for handling communications. The metric a customer desires to optimize for, such as satisfaction score, can be predefined by the customer so that the one or more comparison operations 123 are configured to identify features of the service goal 107 that can deliver on the predefined metric or improve the predefined metric. The one or more comparison operations 123 return one or more recommended service goals 135 to the customer.

As generally described herein above, the intelligent forecaster 110 provides a means for a customer to receive an entity plan 133 and one or more benchmark-plans 134 that can be used, for example, to understand how the operations of the customer's organization stack up against a benchmarked peer group (e.g., benchmark category). Furthermore, in some embodiments, the intelligent forecaster 110 provides a means for a customer to receive specific recommendations to change a feature of their service goal 107 that optimizes the operation of their organization with respect to their benchmarked peer group (e.g., benchmark category).

For example, as described above, the entity plan 133 may be a hiring plan that is predicted to achieve the service goals. In other words, the planner 122 provides one or more benchmark-plans 134 that can assist the user with understanding the different types of service goals their peers (e.g., other contact centers in the same vertical industry) are using, how these goals are impacting customer satisfaction and what would be the impact on their own hiring plans and the costs associated with using the goals if they migrated to one or more of the service goals of their benchmarked peers. Table 1 below depicts an illustration of a set of benchmark-plans implemented by benchmarked peers.

TABLE 1

| Queue type | Service Goal | % Benchmark Customers | Estimated Satisfaction Score |
|---|---|---|---|
| Phone | 80% in 20 seconds | 45 | 86 |
| Phone | 80% in 30 seconds | 25 | 70 |
| Phone | 85% in 20 seconds | 10 | 89 |
| Phone | 85% in 30 seconds | 20 | 78 |
| Email | 80% in 3 hours | 10 | 84 |
| Email | 80% in 4 hours | 50 | 81 |
| Email | 80% in 5 hours | 30 | 75 |
| . . . | . . . | . . . | . . . |

In this example, the service goals in the depicted example are defined by queue type (e.g., phone and email). Furthermore, the benchmark-plans output to the customer indicates the percentage of benchmark customers implementing the corresponding service goal along with an estimated satisfaction score. Other information such as a cost for implementing the various plans and whether implementation would result in a resource saving or not can be computed by comparing the plans with the plan for achieving the customer-defined service goal based on the demand forecast. Additionally, the plan may include a hiring or staffing plan. For example, Table 2 below depicts an illustrative hiring plan for various types of employees (e.g., employees with specific skills).

TABLE 2

| Employee Type | Hire in January | Hire in February | Hire in March | . . . |
|---|---|---|---|---|
| ET1 | 4 | 0 | 2 | . . . |
| ET2 | 1 | 5 | 0 | . . . |
| ET3 | 3 | 3 | 4 | . . . |
| . . . | . . . | . . . | . . . | . . . |

Multi-Cloud Architecture Implementation of the Intelligent Forecaster

Figure 2:
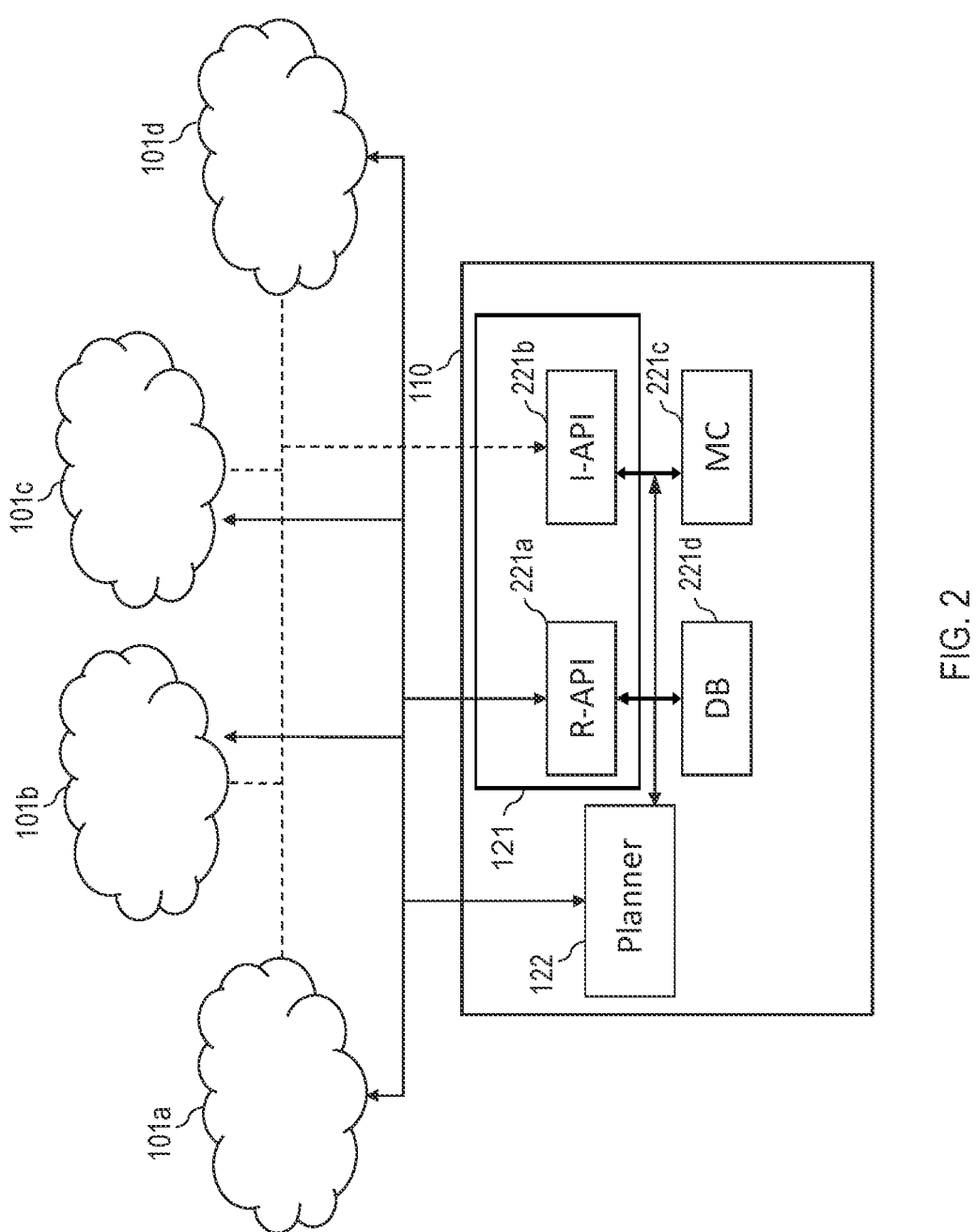
FIG. 2 depicts a block-diagram of the intelligent forecaster with benchmarks implemented in a multi-cloud architecture, according to one or more embodiments shown and described herein.

FIG. 2 illustrates interconnections between example sub-components of a benchmarker 121 (i.e., the R-API 221a and the I-API 221b), a planner 122, a management console (MC) 221c, and a database (DB) 221d, as described with respect to the intelligent forecaster 110 of FIG. 1, with the one or more servers (e.g., different cloud environments 101a, 101b, 101c, and 101d) of the cloud-computing network 101. DB 221d is a database storage component for storing anonymized and de-identified data from a source system (e.g., cloud environments 101a, 101b, 101c, and 101d) pushing information from their systems through the I-API 221b The DB 221d may also store the computed benchmarks for the reporting the R-API 221a to access for analysis and reporting purposes. In some embodiments, the cloud-computing network 101 includes a number of different cloud environments 101a, 101b, 101c, and 101d. These may include different cloud environments such as a private or public hosted cloud infrastructure, different regional cloud environments, or the like.

The R-API 221a may be deployed as an API that interfaces with the cloud environments 101a, 101b, 101c, and 101d and the planner 122 to take requests for category and metrics and determine a benchmark category based on at least the industry of the customer and an industry-defined benchmark. Similarly, the I-API may be deployed as an API that interfaces with the cloud environments 101a, 101b, 101c, and 101d to receive operation and service data from a plurality of customers executing services with the various cloud environments 101a, 101b, 101c, and 101d.

Once data is received, and anonymized by the I-API 221b, the MC 221c creates, edits, and/or removes benchmark categories for publishing. The MC 221c segments and groups the ingested data into like categories which can include, but are not limited to, an industry, sub-industry, function, experience, and/or device (i.e., mobile, tablet, desktop, or the like). The MC 221c may only define a category if there are a sufficient number of independent contributors to the category.

For example, a rule (e.g., predetermined criteria) for defining a category may state that there be a minimum number of different sources contributing data to the benchmark category so that anonymization can be assured. Additionally, the MC 221c manages source data mapping, manages category definition and groups, accesses aggregate data for reporting, and conducts data merge operations. In embodiments, the definition of a benchmark category may be determined by a user. For example, a user may directly select an industry or other parameter defining a benchmark category they desire to use.

Example Method for Providing Benchmark-Plans Based on Benchmark Information

FIG. 3 depicts an example method for providing one or more benchmark-plans to a customer based on benchmark information.

In this example, method 300 begins at step 301 with receiving a customer-defined service goal and a demand forecast for the customer. For example, step 301 may be performed by the intelligent forecaster 110, which may receive a user input generated by the user using the processing system 500 as described above with reference to FIGS. 1 and 5, respectively.

Method 300 proceeds to step 303 with generating a plan for achieving the customer-defined service goal based on the demand forecast. For example, step 303 may be performed by the planner 122 as described above with reference to FIG. 1.

Method 300 proceeds to step 305 with determining a benchmark category from a plurality of benchmark categories that the customer belongs to based on at least an industry of the customer. In embodiments, the benchmark category defines a plurality of other customer-defined service goals for other customers participating in at least the industry as the customer. For example, a benchmark category including other contact center providers would be selected for a contact center customer (i.e., the industry of contact centers) implementing method 300. For example, step 305 may be performed by the benchmarker 121 as described above with reference to FIG. 1.

Method 300 then proceeds to step 307 with determining one or more benchmark service goals based on the determined benchmark category. For example, step 307 may be performed by the benchmarker 121 as described above with reference to FIG. 1.

Method 300 then proceeds to step 309 with executing the planner for each of the one or more benchmark service goals. The planner 122 generates one or more benchmark-plans for the demand forecast for the customer. For example, step 309 may be performed by the planner 122 as described above with reference to FIG. 1.

Method 300 then proceeds to step 311 with outputting the plan and the one or more benchmark-plans. In some embodiments, the one or more benchmark-plans are different from the plan. In such a case, the one or more benchmark-plans may inform the user of a change that can be made to the customer-defined service goal, which would provide a benefit such an estimated amount of resource savings, for example, a cost associated with implementing the plan.

Method 300 then proceeds to step 313 with determining a subset of the one or more benchmark-plans that provide an estimated amount of resource savings and/or an estimated satisfaction score greater than a predefined score. In response to determining that a subset of the one or more benchmark-plans provide estimated amount of resource savings and/or an estimated satisfaction score greater than a predefined score, method 300 proceed with step 315.

Method 300 then proceeds to Step 315 with providing a recommendation to change the customer-defined service goal to the one or more benchmark service goals corresponding to the subset of the one or more benchmark-plans.

Method 300 then proceeds to step 317 with displaying (e.g., on a display of processing system 500 of FIG. 5) the estimated amount of resource savings and/or the estimated satisfaction score for each of the one or more benchmark service goals corresponding to the subset of the one or more benchmark-plans.

In some embodiments, steps 313 and 315 may be performed by the comparison operations 123 and interface component 524 as described above with reference to FIGS. 1 and 5, respectively.

Note that FIG. 3 is just one example of a method, and other methods including fewer, additional, or alternative steps are possible consistent with this disclosure.

Example Method for Providing Benchmark-Plans Based on Benchmark Information

Figure 4:
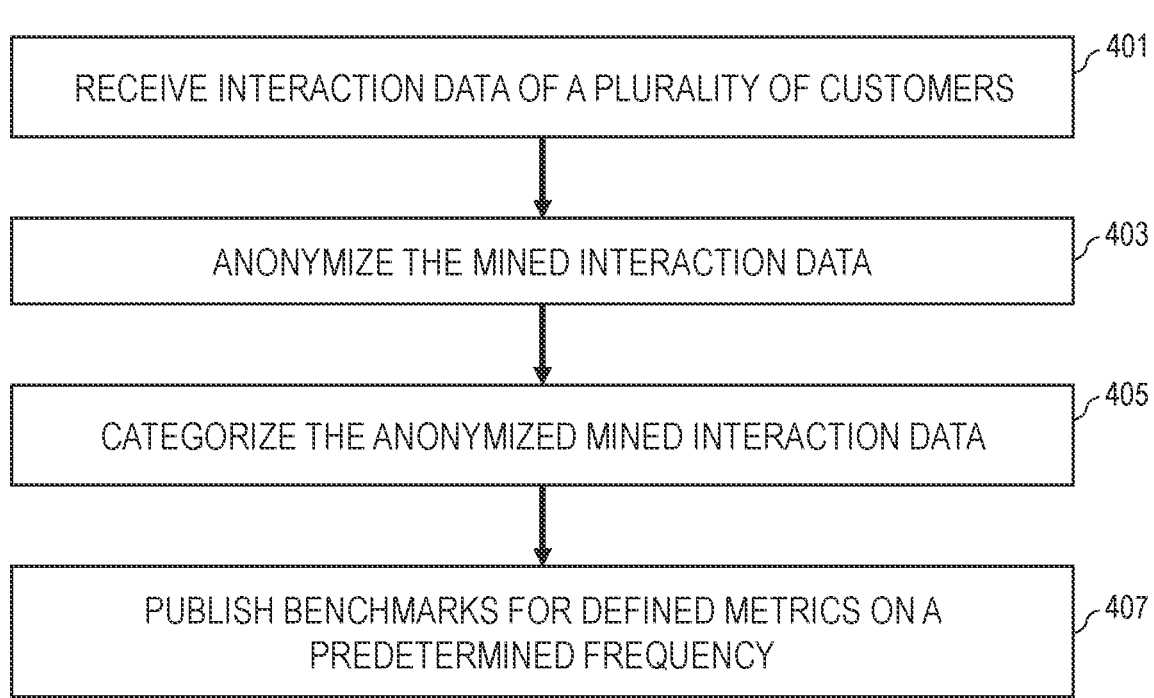
FIG. 4 depicts an illustrative flowchart for an example method for generating a plurality of benchmark categories, according to one or more embodiments shown and described herein.

FIG. 4 depicts an example method 400 for generating benchmark-plans based on a benchmark category of a plurality of benchmark categories that corresponds to the entity.

Method 400 begins at step 401 with receiving (e.g., mining) interaction data from a plurality of customers. For example, the customers may be implementing services through one or more of the plurality of cloud environments 101a, 101b, 101c, and 101d. In some embodiments, step 401 is performed by the I-API 221b interfacing with one or more of the plurality of cloud environments 101a, 101b, 101c, and 101d of the cloud-computing network 101. In such cases, the I-API 221b mines the interaction data based on the metrics 132.

Method 400 then proceeds to step 403 with de-identifying and anonymizing the interaction data as described above with reference to FIGS. 1 and 2.

Method 400 then proceeds to step 405 with categorizing the mined and anonymized interaction data into a plurality of categories.

Method 400 then proceeds to step 407 with publishing benchmarks for defined metrics on a predetermined frequency, such as once a day, week, month, year, or any other predefined frequency.

In some cases, steps 405 and 407 may be performed with the I-API 221b and the MC 221c, respectively, as described above with reference to FIGS. 1 and 2.

Note that FIG. 4 is just one example of a method, and other methods including fewer, additional, or alternative steps are possible consistent with this disclosure.

Example Processing System for Providing Benchmark-Plans Based on Benchmark Information FIG. 5 depicts an example processing system 500 configured to perform the methods described herein.

Processing system 500 includes one or more processors 502. Generally, processor(s) 502 may be configured to execute computer-executable instructions (e.g., software code) to perform various functions, as described herein.

Processing system 504 further includes a network interface(s) X04, which generally provides data access to any sort of data network, including personal area networks (PANs), local area networks (LANs), wide area networks (WANs), the Internet, and the like.

Processing system 500 further includes input(s) and output(s) 506, which generally provide means for providing data to and from processing system 500, such as via connection to computing device peripherals, including user interface peripherals.

Processing system further includes a memory 510 configured to store various types of components and data.

In this example, memory 510 includes a benchmarker component 521, a planner component 522, a comparison component 523, and interface component 524.

Benchmarker component 521 corresponds to the benchmarker 121 as depicted and described herein with reference to FIG. 1. The benchmarker component 521 is configured to perform steps 305 and 307 of method 300 depicted and described with reference to FIG. 3. The benchmarker component 521 is further configured to perform steps 401, 403, 405, and 407 of method 400 depicted and described with reference to FIG. 4.

Planner component 522 corresponds to the planner 122 depicted and described herein with reference to FIG. 1. The planner component 522 is configured to perform steps 303 and 309 of method 300 depicted and described with reference to FIG. 3.

Comparison component 523 corresponds to the comparison operations 123 depicted and described herein with reference to FIG. 1. The comparison component 523 is configured to perform steps 313 and 315 of method 300 depicted and described with reference to FIG. 3.

Interface component 524 is configured to perform steps 301, 311, and 317 of method 300 depicted and described with reference to FIG. 3.

In this example, memory 510 also includes industry data 525, service goal data 526, demand forecast data 527, benchmark categories data 528, metrics data 529, and entity plan data 530.

Industry data 525 refers to industry 106 information of the entity 105 depicted and described herein with reference to FIG. 1. Service goal data 526 refers to a service goal 107 of the entity 105 depicted and described herein with reference to FIG. 1. Demand forecast data 527 refers to demand forecast 108 of the entity 105 depicted and described herein with reference to FIG. 1. Benchmark categories data 528 refers to the plurality of benchmark categories 131 depicted and described herein with reference to FIG. 1. Metrics data 529 refers to the metrics 132 depicted and described herein with reference to FIG. 1. Entity plan data 530 refers to the entity plan 133 depicted and described herein with reference to FIG. 1. Benchmark-plans data 531 refers to the benchmark-plans 134 depicted and described herein with reference to FIG. 1. Recommended service goals data 532 refers to the recommended service goals 135 depicted and described herein with reference to FIG. 1.

Processing system 500 may be implemented in various ways. For example, processing system 500 may be implemented within on-site, remote, or cloud-based processing equipment.

Processing system 500 is just one example, and other configurations are possible. For example, in alternative embodiments, aspects described with respect to processing system 500 may be omitted, added, or substituted for alternative aspects.

As described herein, embodiments of the intelligent forecaster with benchmarks that develop resource plans for a customer based on, for example, a service goal, a forecasted demand, and an anonymized benchmark associated with a customer's industry. For example, embodiments include a method for providing one or more benchmark-plans to a customer based on benchmark information. The method includes receiving a customer-defined service goal and a demand forecast for the customer; generating, with a planner, a plan for achieving the customer-defined service goal based on the demand forecast and determining a benchmark category from a plurality of benchmark categories that the customer belongs to based on at least an industry of the customer. The benchmark category defines a plurality of other customer-defined service goals for other customers participating in at least the industry as the customer. The method further includes determining one or more benchmark service goals based on the determined benchmark category; executing the planner for each of the one or more benchmark service goals thereby generating one or more benchmark-plans for the demand forecast for the customer and outputting, to the customer, the plan and the one or more benchmark-plans. The one or more benchmark-plans are different from the entity's plan.

Example Clauses

Implementation examples are described in the following numbered clauses:

Clause 1: A method for providing one or more benchmark-plans to a customer based on benchmark information, the method comprising receiving a customer-defined service goal and a demand forecast for the customer; generating, with a planner, a plan for achieving the customer-defined service goal based on the demand forecast; determining a benchmark category from a plurality of benchmark categories that the customer belongs to based on at least an industry of the customer, wherein the benchmark category defines a plurality of other customer-defined service goals for other customers participating in at least the industry as the customer; determining one or more benchmark service goals based on the determined benchmark category; executing the planner for each of the one or more benchmark service goals thereby generating one or more benchmark-plans for the demand forecast for the customer; and outputting, to the customer, the plan and the one or more benchmark-plans, wherein the one or more benchmark-plans are different from the plan.

Clause 2: The method of Clause 1, further comprising determining a subset of the one or more benchmark-plans that provide an estimated amount of resource savings; and providing, to the customer, a recommendation to change the customer-defined service goal to the one or more benchmark service goals corresponding to the subset of the one or more benchmark-plans.

Clause 3: The method of Clause 2, wherein the recommendation to change the customer-defined service goal to the one or more benchmark service goals is provided when the estimated amount of resource savings is greater than predefined amount.

Clause 4: The method of Clause 1, further comprising determining a subset of the one or more benchmark-plans that provide an estimated amount of resource savings and an estimated satisfaction score greater than a predefined score; and providing a recommendation to change the customer-defined service goal to the one or more benchmark service goals corresponding to the subset of the one or more benchmark-plans.

Clause 5: The method of Clause 4, wherein providing the recommendation further includes displaying the estimated amount of resource savings and the estimated satisfaction score for each of the one or more benchmark service goals corresponding to the subset of the one or more benchmark-plans.

Clause 6: The method of any one of Clauses 1-5, wherein determining the benchmark category that the customer belongs to is further based on one or more customer specified metrics.

Clause 7: The method of any one of Clauses 1-6, wherein determining the benchmark category that the customer belongs to comprises matching one or more metrics associated with the customer to metrics from an anonymized dataset associated with a plurality of other customers.

Clause 8: The method of any one of Clauses 1-7, further comprising generating the plurality of benchmark categories by: receiving interaction data of a plurality of other customers; anonymizing the mined interaction data; and categorizing the anonymized mined interaction data by at least one of an industry and one or more additional metrics.

Clause 9: The method of any one of Clauses 1-8, wherein the plan comprises a staffing plan.

Clause 10: A computer-implemented system for providing one or more benchmark-plans to a customer based on benchmark information, the computer-implemented system comprising: a processor and a non-transitory computer-readable medium storing computer readable instructions that, when executed by the processor, cause the system to: receive a customer-defined service goal and a demand forecast for the customer; generate, with a planner, a plan for achieving the customer-defined service goal based on the demand forecast; determine a benchmark category from a plurality of benchmark categories that the customer belongs to based on at least an industry of the customer, wherein the benchmark category defines a plurality of other customer-defined service goals for other customers participating in at least the industry as the customer; determine one or more benchmark service goals based on the determined benchmark category; execute the planner for each of the one or more benchmark service goals thereby generating one or more benchmark-plans for the demand forecast for the customer; and output, to the customer, the plan and the one or more benchmark-plans, wherein the one or more benchmark-plans are different from the plan.

Clause 11: The computer-implemented system of Clause 10, further comprising computer readable instructions that, when executed by the processor, cause the processor to: determine a subset of the one or more benchmark-plans that provide an estimated amount of resource savings; and provide a recommendation to change the customer-defined service goal to the one or more benchmark service goals corresponding to the subset of the one or more benchmark-plans.

Clause 12: The computer-implemented system of Clause 11, wherein the recommendation to change the customer-defined service goal to the one or more benchmark service goals is provided when the estimated amount of resource savings is greater than predefined amount.

Clause 13: The computer-implemented system of any one of Clause 12, further comprising computer readable instructions that, when executed by the processor, cause the processor to: determine a subset of the one or more benchmark-plans that provide an estimated amount of resource savings and an estimated satisfaction score greater than a predefined score; and provide a recommendation to change the customer-defined service goal to the one or more benchmark service goals corresponding to the subset of the one or more benchmark-plans.

Clause 14: The computer-implemented system of Clause 12, wherein providing the recommendation further includes causing the processor to display the estimated amount of resource savings and the estimated satisfaction score for each of the one or more benchmark service goals corresponding to the subset of the one or more benchmark-plans.

Clause 15: The computer-implemented system of any one of Clauses 10-14, wherein determining the benchmark category that the customer belongs to is further based on one or more customer specified metrics.

Clause 16: The computer-implemented system of any one of Clauses 10-15, wherein determining the benchmark category that the customer belongs to comprises matching one or more metrics associated with the customer to metrics from an anonymized dataset associated with a plurality of other customers.

Clause 17: The computer-implemented system of any one of Clauses 10-15, wherein the plan comprises a staffing plan.

Clause 18: A system for providing one or more benchmark-plans to a customer based on benchmark information, the system comprising: a computing device communicatively coupled to one or more cloud based servers, the computing device configured to: receive, as an input from a user, a customer-defined service goal receive, from one of the one or more cloud based servers, a demand forecast for the customer; receive, from a planner deployed on one of the one or more cloud based servers, a plan for achieving the customer-defined service goal based on the demand forecast; determine a benchmark category from a plurality of benchmark categories that the customer belongs to based on at least an industry of the customer, wherein the benchmark category defines a plurality of other customer-defined service goals for other customers participating in at least the industry as the customer; determine one or more benchmark service goals based on the determined benchmark category; execute the planner for each of the one or more benchmark service goals thereby generating one or more benchmark-plans for the demand forecast for the customer; and output, to the customer, the plan and the one or more benchmark-plans, wherein the one or more benchmark-plans are different from the plan.

Clause 19: The system of Clause 18, wherein the computing device is further configured to: determine a subset of the one or more benchmark-plans that provide an estimated amount of resource savings; and provide a recommendation to change the customer-defined service goal to the one or more benchmark service goals corresponding to the subset of the one or more benchmark-plans.

Clause 20: The system of Clause 19, wherein the recommendation to change the customer-defined service goal to the one or more benchmark service goals is provided when the estimated amount of resource savings is greater than predefined amount.

Clause 21: A processing system, comprising: a memory comprising computer-executable instructions; and a processor configured to execute the computer-executable instructions and cause the processing system to perform a method in accordance with any one of Clauses 1-9.

Clause 22: A processing system, comprising means for performing a method in accordance with any one of Clauses 1-9.

Clause 23: A non-transitory computer-readable medium comprising computer-executable instructions that, when executed by a processor of a processing system, cause the processing system to perform a method in accordance with any one of Clauses 1-9.

Clause 24: A computer program product embodied on a computer-readable storage medium comprising code for performing a method in accordance with any one of Clauses 1-9.

Additional Considerations

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents.

What is claimed is:

1. A method for forecasting with anonymized benchmarks, the method comprising:

receiving, by an interface component of an intelligent forecaster implemented by a processing system, a customer-defined service goal and a demand forecast for a customer;

generating, by a planner component of the intelligent forecaster, an entity plan for achieving the customer-defined service goal based on the demand forecast, wherein the entity plan comprises at least one of a staffing plan, resource allocation plan, or hiring plan for predicted future operations of the customer;

mining, by a first application programming interface (API) of the intelligent forecaster, interaction data from a plurality of other organizations operating across one or more private environments, wherein the first API is configured to interface with the one or more private cloud environments to receive operation and service data from the plurality of other organizations executing services with the one or more private cloud environments;

anonymizing, by the first API, the mined interaction data;

generating, by the first API, a plurality of benchmark categories by categorizing the mined interaction data by at least one of an industry and one or more additional metrics, wherein each benchmark category of the plurality of benchmark categories has a minimum number of different organizations contributing data to the benchmark category;

selecting, by the first API, a benchmark category from the plurality of benchmark categories based on a parameter defining the customer;

determining, by a second API of the intelligent forecaster, one or more benchmark service goals based on the benchmark category, wherein the second API is configured to interface with the one or more private cloud environments and the planner component to identify the benchmark category from the plurality of benchmark categories based at least on an industry associated with the customer;

generating, by the planner component, one or more benchmark-plans based on the one or more benchmark service goals for the demand forecast for the customer;

identifying, by a comparison component of the intelligent forecaster, a change from the customer-defined service goal to one of the one or more benchmark service goals that improves an operation or service metric through one or more comparison operations based on the entity plan and the one or more benchmark-plans; and outputting, by the interface component of the intelligent forecaster and for display to the customer, the entity plan, the one or more benchmark-plans, and the change from the customer-defined service goal to the one or more benchmark service goals that improves the operation or service metric, wherein the one or more benchmark-plans are different from the entity plan.

2. The method of claim 1, further comprising:

determining, by the comparison component, a subset of the one or more benchmark-plans that provide an estimated amount of resource savings based on the one or more comparison operations between the entity plan and the one or more benchmark-plans; and providing, by the interface component, a recommendation to change the customer-defined service goal to the one of the one or more benchmark service goals corresponding to the subset of the one or more benchmark-plans.

3. The method of claim 2, wherein the recommendation to change the customer-defined service goal to the one of the one or more benchmark service goals is provided when the estimated amount of resource savings is greater than a predefined amount.

4. The method of claim 1, further comprising:

determining, by the comparison component, a subset of the one or more benchmark-plans that provide an estimated amount of resource savings and an estimated satisfaction score greater than a predefined score based on the one or more comparison operations between the entity plan and the one or more benchmark-plans; and providing, by the interface component, a recommendation to change the customer-defined service goal to the one of the one or more benchmark service goals corresponding to the subset of the one or more benchmark-plans.

5. The method of claim 4, wherein providing the recommendation further includes displaying the estimated amount of resource savings and the estimated satisfaction score for each of the one or more benchmark service goals corresponding to the subset of the one or more benchmark-plans.

6. The method of claim 1, wherein the one or more additional metrics comprise task or organization focused operating and service metrics defining data to be collected from operational data of the plurality of other organizations deploying their services within the one or more private cloud environments.

7. The method of claim 1, wherein selecting the benchmark category comprises matching the parameter defining the customer to one or more parameters defining organizations of the benchmark category.

8. The method of claim 1, further comprising scoring a relatedness of the benchmark category to the customer based on a comparison of the parameter defining the customer and one or more parameters defining organizations of the benchmark category.

9. A computer-implemented system for forecasting with anonymized benchmarks, the computer-implemented system comprising:

a processor and a non-transitory computer-readable medium storing computer readable instructions that, when executed by the processor, cause the computer-implemented system to:

receive, by an interface component of an intelligent forecaster, a customer-defined service goal and a demand forecast for a customer;

generate, by a planner component of the intelligent forecaster, an entity plan for achieving the customer-defined service goal based on the demand forecast, wherein the entity plan comprises at least one of a staffing plan, resource allocation plan, or hiring plan for predicted future operations of the customer;

mine, by a first application programming interface (API) of the intelligent forecaster, interaction data from a plurality of other organizations operating across one or more private cloud environments, wherein the first API is configured to interface with the one or more private cloud environments to receive operation and service data from the plurality of other organizations executing services with the one or more private cloud environments;

anonymize, by the first API, the mined interaction data;

generate, by the first API, a plurality of benchmark categories by categorizing the mined interaction data by at least one of an industry and one or more additional metrics, wherein each benchmark category of the plurality of benchmark categories has a minimum number of different organizations contributing data to the benchmark category;

select, by the first API, a benchmark category from the plurality of benchmark categories based on a parameter defining the customer;

determine, by a second API of the intelligent forecaster, one or more benchmark service goals based on the benchmark category, wherein the second API is configured to interface with the one or more private cloud environments and the planner component to identify the benchmark category from the plurality of benchmark categories based at least on an industry associated with the customer;

generate, by the planner component, one or more benchmark-plans based on the one or more benchmark service goals for the demand forecast for the customer;

identify, by a comparison component of the intelligent forecaster, a change from the customer-defined service goal to one of the one or more benchmark service goals that improves an operation or service metric through one or more comparison operations based on the entity plan and the one or more benchmark-plans; and output, by the interface component of the intelligent forecaster and for display to the customer, the entity plan, the one or more benchmark-plans, and the change from the customer-defined service goal to the one or more benchmark service goals that improves the operation or service metric, wherein the one or more benchmark-plans are different from the entity plan.

10. The computer-implemented system of claim 9, further comprising computer readable instructions that, when executed by the processor, cause the computer-implemented system to:

determine, by the comparison component, a subset of the one or more benchmark-plans that provide an estimated amount of resource savings based on the one or more comparison operations between the entity plan and the one or more benchmark-plans; and provide, by the interface component, a recommendation to change the customer-defined service goal to the one of the one or more benchmark service goals corresponding to the subset of the one or more benchmark-plans.

11. The computer-implemented system of claim 10, wherein the recommendation to change the customer-defined service goal to the one of the one or more benchmark service goals is provided when the estimated amount of resource savings is greater than a predefined amount.

12. The computer-implemented system of claim 9, further comprising computer readable instructions that, when executed by the processor, cause the computer-implemented system to:

determine, by the comparison component, a subset of the one or more benchmark-plans that provide an estimated amount of resource savings and an estimated satisfaction score greater than a predefined score based on the one or more comparison operations between the entity plan and the one or more benchmark-plans; and provide, by the interface component, a recommendation to change the customer-defined service goal to the one of the one or more benchmark service goals corresponding to the subset of the one or more benchmark-plans.

13. The computer-implemented system of claim 12, wherein providing the recommendation further includes causing the processor to display the estimated amount of resource savings and the estimated satisfaction score for each of the one or more benchmark service goals corresponding to the subset of the one or more benchmark-plans.

14. The computer-implemented system of claim 9, wherein the one or more additional metrics comprise task or organization focused operating and service metrics defining data to be collected from operational data of the plurality of other organizations deploying their services within the one or more private cloud environments.

15. The computer-implemented system of claim 9, further comprising computer readable instructions that, when executed by the processor, cause the computer-implemented system to select the benchmark category matching the parameter defining the customer to one or more parameters defining organizations of the benchmark category.

16. The computer-implemented system of claim 9, further comprising computer readable instructions that, when executed by the processor, cause the computer-implemented system to score a relatedness of the benchmark category to the customer based on a comparison of the parameter defining the customer and one or more parameters defining organizations of the benchmark category.

17. A computer-implemented system for forecasting with anonymized benchmarks, the computer-implemented system comprising:

a computing device communicatively coupled to one or more cloud-based servers, the computing device configured to:

receive, by an interface component of an intelligent forecaster implemented by the computing device, input from a user comprising a customer-defined service goal;

receive, from one of the one or more cloud-based servers, a demand forecast for a customer;

receive, by a planner component of the intelligent forecaster, an entity plan for achieving the customer-defined service goal based on the demand forecast, wherein the entity plan comprises at least one of a staffing plan, resource allocation plan, or hiring plan for predicted future operations of the customer;

mine, by a first application programming interface (API) of the intelligent forecaster, interaction data from a plurality of other organizations operating across one or more private cloud environments, wherein the first API is configured to interface with the one or more private cloud environments to receive operation and service data from the plurality of other organizations executing services with the one or more private cloud environments;

anonymize, by the first API, the mined interaction data;

generate, by the first API, a plurality of benchmark categories by categorizing the mined interaction data by at least one of an industry and one or more additional metrics, wherein each benchmark category of the plurality of benchmark categories has a minimum number of different organizations contributing data to the benchmark category;

select, by the first API, a benchmark category from the plurality of benchmark categories based on a parameter defining the customer;

determine, by a second API of the intelligent forecaster, one or more benchmark service goals based on the benchmark category, wherein the second API is configured to interface with the one or more private cloud environments and the planner component to identify the benchmark category from the plurality of benchmark categories based at least on an industry associated with the customer;

generate, by the planner component, one or more benchmark-plans based on the one or more benchmark service goals for the demand forecast for the customer;

identify, by a comparison component of the intelligent forecaster, a change from the customer-defined service goal to one of the one or more benchmark service goals that improves an operation or service metric through one or more comparison operations based on the entity plan and the one or more benchmark-plans; and output, by the interface component of the intelligent forecaster and for display to the customer, the entity plan, the one or more benchmark-plans, and the change from the customer-defined service goal to the one or more benchmark service goals that improves the operation or service metric, wherein the one or more benchmark-plans are different from the entity plan.

18. The computer-implemented system of claim 17, wherein the computing device is further configured to:

determine, by the comparison component, a subset of the one or more benchmark-plans that provide an estimated amount of resource savings based on the one or more comparison operations between the entity plan and the one or more benchmark-plans; and provide, by the interface component, a recommendation to change the customer-defined service goal to the one of the one or more benchmark service goals corresponding to the subset of the one or more benchmark-plans.

19. The computer-implemented system of claim 18, wherein the recommendation to change the customer-defined service goal to the one of the one or more benchmark service goals is provided when the estimated amount of resource savings is greater than a predefined amount.

20. The method of claim 1, wherein the parameter defining the customer comprises at least one of an industry of the customer, size of the customer, or location of the customer.

\* \* \* \* \*